United States Patent [19]

Southwick

[11] Patent Number: 5,145,896
[45] Date of Patent: Sep. 8, 1992

[54] PROCESS FOR THE REDUCTION OF DIENE POLYMER HOT MELT ADHESIVE COLOR

[75] Inventor: Jeffrey G. Southwick, Houston, Tex.

[73] Assignee: Shell Oil Company, Houston, Tex.

[21] Appl. No.: 756,666

[22] Filed: Sep. 9, 1991

[51] Int. Cl.$^5$ .................... C08K 5/58; C08K 5/57
[52] U.S. Cl. ..................... 524/180; 524/178; 524/181
[58] Field of Search ............... 524/180, 181, 182, 178, 524/179; 525/250; 526/187

[56] References Cited

U.S. PATENT DOCUMENTS

| | | | |
|---|---|---|---|
| 2,514,198 | 7/1950 | Hansen et al. | 524/329 |
| 2,789,102 | 4/1957 | Weinberg | 524/180 |
| 2,789,107 | 4/1957 | Weinberg et al. | 524/178 |
| 2,790,785 | 4/1957 | Ramsden et al. | 524/180 |
| 2,801,258 | 7/1957 | Johnson | 524/180 |
| 2,985,617 | 5/1961 | Salyer et al. | 524/178 |
| 3,393,182 | 7/1968 | Trepka | 260/79.5 |
| 3,520,952 | 7/1970 | Hecker et al. | 260/878 |
| 4,096,203 | 6/1978 | St. Clair | 525/314 |
| 4,144,287 | 3/1979 | Kudo et al. | 260/876 R |
| 4,415,695 | 11/1983 | Sarkar | 525/250 |
| 4,536,545 | 8/1985 | Olener et al. | 525/75 |
| 4,778,841 | 10/1988 | Wildeman | 524/151 |
| 4,857,575 | 8/1989 | van der Meer et al. | 524/398 |

FOREIGN PATENT DOCUMENTS

| | | |
|---|---|---|
| 0333936 | 3/1988 | European Pat. Off. |
| 2446285 | 9/1973 | Fed. Rep. of Germany |
| 69-015185 | 12/1965 | Japan |
| 74-108848 | 7/1968 | Japan |
| 58108264 | 12/1981 | Japan |
| 58-208364A | 5/1982 | Japan |
| 59-113047 | 12/1982 | Japan |
| 59-135267 | 1/1983 | Japan |
| 63-089562 | 9/1986 | Japan |
| 01081844 | 9/1987 | Japan |
| 01242653 | 3/1988 | Japan |
| 6514261 | 5/1966 | Netherlands |
| 958459A | 1/1981 | U.S.S.R. |
| 2191203A | 12/1987 | United Kingdom |

OTHER PUBLICATIONS

Plastics Additives Handbook, edited by R. Gächter and H. Müller, published by Hanser Publishers in 1983, pp. 192-249.

*Primary Examiner*—Veronica P. Hoke
*Attorney, Agent, or Firm*—Donald F. Haas

[57] ABSTRACT

A method of reducing the color of a hot melt adhesive formulation comprising a polymer of a conjugated diene which comprises adding to the formulation an amount of an alkyltin compound selected from the group consisting of mercaptides, mercaptocarboxylates, and carboxylates sufficient to reduce color formation.

10 Claims, No Drawings

PROCESS FOR THE REDUCTION OF DIENE POLYMER HOT MELT ADHESIVE COLOR

BACKGROUND OF THE INVENTION

This invention relates to the reduction of color formation in hot melt adhesive formulations which contain diene polymers, especially block copolymers of conjugated dienes and vinyl aromatic hydrocarbons. More particularly, it relates to the reduction of such color formation by the addition of specific alkyltin compounds to such formulations.

It is known that a block copolymer can be obtained by an anionic copolymerization of a conjugated diene compound and an alkenyl arene compound by using an organic alkali metal initiator. Block copolymers have been produced which comprises primarily those having a general structure A—B and A—B—A wherein the polymer blocks A comprise thermoplastic polymer blocks of alkenyl arenes such as polystyrene, while block B is a polymer block of a conjugated diene such as butadiene or isoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A—B—A rubber to behave like a conventionally vulcanized rubber in the unvulcanized state and is applicable for various uses. For example, these network forming polymers are applicable for uses such in adhesive formulations; as moldings of shoe soles, etc.; impact modifier for polystyrene resins and engineering thermoplastics; modification of asphalt; etc.

Many such polymers are made by coupling with coupling agents as described in U.S. Pat. No. 4,096,203. Such coupling agents may contain halogens and often there is some residual halogen which reacts with residual lithium to form LiX.

Adhesive formulations containing coupled polymers containing LiI, LiCl or LiBr salts are known to develop a brown color when aged at high temperatures such as 177° C. This problem does not occur in sequentially polymerized polymers. This is considered a problem for hot melt adhesive manufacturers who sometimes hold adhesives at high temperatures for extended times during hot melt application. The brown color is undesirable for many end uses for such adhesive products such as diaper assembly, clear labels, clear tapes, clear decals, etc.

I have found that color generation is not correlated with increased oxidative degradation. Thus, the commonly used methods for dealing with color formation in polymers are not effective in this situation. I have found that the use of specific alkyltin stabilizers will greatly reduce the color formation in such hot melt adhesive formulations.

SUMMARY OF THE INVENTION

The present invention provides a method of reducing the color of a hot melt adhesive formulation comprising a polymer with residual LiI, LiBr or LiCl salts such as coupled polymers including block copolymers of a conjugated diene and a vinyl aromatic hydrocarbon. The process comprises adding to the formulation an amount of an alkyltin compound selected from the group consisting of mercaptides, mercaptocarboxylates and carboxylates sufficient to reduce color formation. In a preferred embodiment, at least about the stoichiometric equivalent (relative to the moles of $Cl^-$, $Br^-$, or $I^-$ in the polymer) of the alkyltin compound should be used. The preferred alkyltin compounds are dialkyltin mercaptides, especially dioctyltin mercaptide. The present invention also encompasses a color stabilized product made by the above process.

DETAILED DESCRIPTION OF THE INVENTION

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,3-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethylstyrene, vinylnapthalene, vinylanthracene and the like may be used. The copolymers may, of course, be random, tapered, block or a combination of these, in this case block.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about $-150°$ C. to about 300° C., preferably at a temperature within the range from about 0° C. to about 100° C. Particularly effective anionic polymerization initiators are organolithium compounds having the general formula:

$$RLi_n$$

Wherein: R is an aliphatic, cycloaliphatic, aromatic or alkyl-substituted aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenerated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, tetrahydrofuran and the like; ketones such as methyl ketone (acetone), methyl ethyl ketone, ethyl ketone (e-pentanone) and the like.

The process by which the block copolymers are prepared is not critical to this invention except that the polymers should be produced by the well known coupling technique of block polymerization because only coupled polymers yielding LiCl, LiBr, or LiI salts give bad color. Sequentially polymerized polymers need no stabilization. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356. The disclosures of all of the patents mentioned in this paragraph are herein incorporated by reference. If desired, these block copolymers can be hydrogenated. Hydrogenation may be effected selectively as disclosed in U.S. Pat. No. Re: 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts.

It may be necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 which is incorporated by reference. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr. The selection of the particular tackifying agent is, in large part, dependent upon the specific block copolymer employed in the respective adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation caused by the commonly known yellowing due to oxidative degradation. Stabilizers are typically added to the commercially available compounds in order to protect the polymers against heat degradation and oxidation during the preparation, use and high temperature storage of the adhesive composition. Additional stabilizers known in the art may also be incorporated into the adhesive composition.

As discussed above, such adhesive formulations, when used as hot melt adhesives, have a tendency to turn brown when aged at high temperature. I have found that this phenomenon is not caused by the commonly known phenomenon of oxidative degradation. The normal methods of reducing color formation due to such causes do not stop color formation in hot melt adhesive formulations containing $Cl^-$, $Br^-$, or $I^-$ containing polymers of conjugated dienes or copolymers thereof with vinyl aromatic hydrocarbons.

I have found that a reduction in the color formation of hot melt adhesive formulations utilizing such block copolymers can be achieved by adding to the formulation an amount of an alkyltin compound sufficient to reduce color formation. The effective alkyltin compounds are selected from the group consisting of mercaptides, mercaptocarboxylates, and carboxylates. Preferably, the alkyltin compound is present in the amount of at least the stoichiometric equivalent relative to the moles of $Cl^-$, $Br^-$, or $I^-$ remaining in the rubber. For KRATON ® D 1107 and di-octyl tin mercaptide, this amount is 0.46 phr. The preferred alkyltin compounds are dialkyltin mercaptides because of their apparent reactivity with Br salts in hot melt adhesives, particularly dioctyltin mercaptide because of enhanced solubility in the hot melt. Surprisingly, these alkyltin stabilizers are effective in amounts which are much less then what would ordinarily be expected. Suitable alkyltin compounds useful in the present invention include those which are sometimes used as stabilizers for polyvinylchloride. The organotin mercaptides, mercaptocarboxylates and carboxylates are described in the *PLASTICS ADDITIVES HANDBOOK—Stabilizers, Processing Aids, Plasticizers, Fillers, Reinformcements, Colorants* for *Thermoplastics* edited by R. Gächter and H. Müller and published in 1985 by Hanser Publishers of, Munich, Vienna and New York and distributed in the United States of America by Macmillan Publishing Co., Inc., of New York, N.Y., which is herein incorporated by reference.

Many block copolymers of conjugated dienes and vinyl aromatic hydrocarbons contain residual lithium bromide because of the process by which they are made which is discussed above. It is my theory that the color formation in hot melt adhesive formulations containing these polymers is caused by the presence of lithium bromide in the polymer. I feel that the color is caused by the reaction of lithium bromide with oxygen. I have been able to achieve a color reduction by using certain phosphite anti-oxidants in the hot melt or by reducing the level of lithium bromide in the polymer by water washing the polymer cement. Both of these approaches have serious drawbacks since effective antioxidants are expensive and have limited FDA clearance and water washing requires a large capital investment.

It is my theory that the alkyltin stabilizers described above are effective at reducing color formation in such adhesive formulations because they have the ability to scavenge lithium bromide from the polymer. In doing so, they effectively bind the bromide into chemical structures that will not form color bodies as the hot melt adhesives are aged. The scavenging effect of these stabilizers is likely to be the reason why they are effective in such surprisingly low amounts.

EXAMPLES

In the following examples, hot melt adhesives were compounded in a Sigma blade mixer utilizing the following formulation: 25% KRATON® D1107 rubber (a linear styrene-isoprene-styrene block copolymer), 60% ESCOREZ® 5300 hydrogenated resin, 15% TUFFLO® 6056 oil and 0.5% IRGANOX® 1010 antioxidant (tetrakis[methylene(3,5-di-tert-butyl-4-hydroxy hydrocinnamate)]methane). This formulation was used because the particular resin and oil are very color stable and it is theorized that differences in color formation must then be due to the lithium bromide present in the rubber and to the efficiency of stabilizers used to retard the reactions of lithium bromide with oxygen.

The stabilizers in the examples were mixed into the rubber hot melt adhesive formulations at a concentration of 1 weight percent. Aging of the formulation was performed at 177° C. with 100 grams of adhesive formulation in a 200 ml Griffin tallform beaker covered with aluminum foil. Aliquots of the aged adhesive were poured off into 10 ml beakers and these samples were color rated with a Gardner color comparator. Adhesive color was determined after aging for 4, 8, 24, 48 and 96 hours.

EXAMPLE I

The following stabilizers were utilized to test their effect in reducing hot melt adhesive color:

TABLE 1

| Trade Name | Description | Structure |
|---|---|---|
| Mark OTM | di-octyltin mercaptide | $C_8H_{17}$, $C_8H_{17}$—Sn—S—$CH_2$C(=O)—O$C_8H_{17}$ / S—$CH_2$—C(=O)—O—$C_8H_{17}$ |
| Mark 1900 | dimethyltin mercaptide | $CH_3$, $CH_3$—Sn—S—$CH_2$—C(=O)—O—$CH_3$ / S—$CH_2$—C(=O)—O—$CH_3$ |
| Mark 2100 | dibutyltin maleate blend | $C_4H_9$, $C_4H_9$—Sn—O—C(=O)—CH=CH—O—C(=O) |
| Mark 2100A | above with phenolic AO | — |
| Mark QED | zinc stearate | $Zn(O-C(=O)-C_{18}H_{37})_2$ |
| Mark 1500 | tertiary organo phosphite | — |
| Mark 5111 | hindered phenol blend | — |

Stabilizers from Argus Chemical

The effect of the above stabilizers on hot melt adhesive color is shown in Table 2 below:

TABLE 2

Effect of Stabilizers on Hot Melt Color

| | | | Gardner Color Numbers | | | | |
|---|---|---|---|---|---|---|---|
| System | Chemical Name | Unaged | 4 hrs | 8 hrs | 24 hrs | 48 hrs | 96 hrs |
| Mark OTM | alkyltin mercaptide | 1 | 2 | 3 | 6 | 11 | 15 |
| Mark QED | zinc stearate | 3 | 6 | 6 | 14 | 16 | 18 |
| Mark 1500 | tertiary organo phosphite | 1 | 3 | 5 | 10 | 15 | 18+ |
| Mark 1900 | alkyltin mercaptide | 2 | 3 | 5 | 7 | 9 | 18+ |
| Mark 2100 | dibutyltin maleate blend | 2 | 3 | 3 | 8 | 11 | 12 |
| Mark 2100A | dibutyltin maleate blend | 2 | 5 | 3+ | 8 | 12 | 13 |
| Mark 5111 | hindered phenol blend | 2 | 5 | 5 | 11 | 13 | 16 |
| A | | 1 | 3 | 5 | 7 | 10 | — |
| No additive | | 1 | 5 | 5 | 10 | 12 | 15 |

It can be seen that three of the stabilizer systems reduced color, Mark OTM, the dioctyltin mercaptide, Mark 1900, the dimethyltin mercaptide and Mark 2100, the dibutyltin maleate blend. The phenolic and phosphite antioxidants did not improve hot melt color nor did the zinc stearate antioxidant. Each of these is compared against the results for the experiment which was done with no additive. The results at 96 hours are not considered to be particularly important because hot melt adhesives are essentially unusable after such aging because of extensive viscosity loss. A hot melt formulation (A) utilizing a SIS block copolymer with low residual lithium bromide levels was included for comparative purposes. According to my theory, such a polymer would be expected to have relatively low color and, indeed, this polymer is considered in the industry to have excellent color stability. It can be seen that the stabilizers utilized according to the present invention produced Gardner color numbers which compare favorably to those of this polymer.

EXAMPLE II

In this example, varying amounts of Mark OTM stabilizer were utilized to determine the effect of concentration on the color reduction. As can be seen by the results shown in Table 3 below, surprisingly, the color reduction increases when smaller amounts of the stabilizer are utilized.

TABLE 3

Effect of Mark OTM Concentration on Hot Melt Color

| | Gardner Color Numbers | | | | | |
|---|---|---|---|---|---|---|
| | Unaged | 4 hrs | 8 hrs | 24 hrs | 48 hrs | 96 hrs |
| 0% OTM | 1 | 5 | 5 | 9 | 11 | 13 |
| 1% OTM | 1 | 2 | 3 | 7 | 9 | 12 |
| 0.5% OTM | 1 | 1 | 2 | 6 | 8 | 11 |
| 0.25% OTM | 1 | 1 | 1 | 4 | 5 | 8 |
| 0.10% OTM | 1 | 1 | 1 | 4 | 5 | 8 |

EXAMPLE III

In this example, the specific dioctyltin mercaptide (OTM) of the present invention was compared directly with another organotin stabilizer, tin acetate, to determine their relative effects on color reduction. For a contrast, one test was done with the normal stabilizer and no organotin compound. The concentrations of the two tin compounds were chosen so that a nearly equal molar concentration of stabilizer was used —the concentration of the dioctyltin mercaptide was 1.0% and the concentration of the tin acetate was 0.32%. Also shown is the unexpected better color performance with 0.1% OTM. From the results shown in Table 4 below, it can be seen that while the stabilizer of the present invention greatly reduced the color, the tin acetate only reduced the color to an insignificant extent. Thus, it can be seen that only particular organotin compounds can be used to achieve the desired result.

TABLE 4

| | Gardner Color Numbers | | | | | |
|---|---|---|---|---|---|---|
| | Unaged | 4 hrs | 8 hrs | 24 hrs | 48 hrs | 96 hrs |
| normal stabilizer (Irganox 1010) | 1 | 5 | 5 | 10 | 12 | 15 |
| Irg 1010 and 0.32% tin acetate | 2 | 4 | 5 | 9 | 11 | 14 |
| Irg 1010 and 1.0% octyl-tin mercaptide | 1 | 2 | 3 | 7 | 9 | 12 |
| Irg 1010 and 0.1% octyl-tin mercaptide | 1 | 1 | 1 | 4 | 5 | 8 |

I claim:

1. A method of reducing the color of a hot melt adhesive formulation comprising a polymer of a conjugated diene which contains residual LiBr, LiCl or LiI salts which comprises adding to the formulation an amount of an alkyltin compound selected from the group consisting of dialkyltin mercaptides, dialkyltin mercaptocarbooxylates, and dialkyltin carboxylates sufficient to reduce color formation.

2. The method of claim 1 wherein the concentration of the alkyltin compound is at least the stoichiometric equivalent relative to the moles of $Cl^-$, $Br^-$, or $I^-$ in the polymer.

3. The method of claim 1 wherein the alkyltin compound is a dialkyltin compound.

4. The method of claim 3 wherein the dialkyltin compound is a dioctyltin mercaptide.

5. The method of claim 1 wherein the polymer is a block copolymer of a conjugated diene and a vinyl aromatic hydrocarbon.

6. The product of the process of claim 1.
7. The product of the process of claim 2.
8. The product of the process of claim 3.
9. The product of the process of claim 4.
10. The product of the process of claim 5.

* * * * *